(12) United States Patent
Lecomte et al.

(10) Patent No.: US 7,633,941 B2
(45) Date of Patent: Dec. 15, 2009

(54) SECURED DISTRIBUTED METHOD AND SYSTEM FOR THE DISTRIBUTION OF AUDIOVISUAL FLOWS

(76) Inventors: Daniel Lecomte, 157, rue de la Pompe, F-75116 Paris (FR); Reda Hosny, 36, rue de Picpus, Immeuble les Chênes, F-75012 Paris (FR); Mohammed Lamtouni, 35, avenue Simon Bolivar, F-75019 Paris (FR)

(*) Notice: Subject to any disclaimer, the term of this patent is extended or adjusted under 35 U.S.C. 154(b) by 470 days.

(21) Appl. No.: 11/387,284

(22) Filed: Mar. 23, 2006

(65) Prior Publication Data

US 2006/0184686 A1     Aug. 17, 2006

Related U.S. Application Data

(63) Continuation of application No. PCT/FR2004/002652, filed on Oct. 15, 2004.

(30) Foreign Application Priority Data

Oct. 15, 2003 (FR) .................................. 03 50684

(51) Int. Cl.
*H04L 12/56* (2006.01)
*H04N 7/167* (2006.01)
(52) U.S. Cl. .................. 370/389; 360/60; 380/201; 386/94
(58) Field of Classification Search .................. None
See application file for complete search history.

(56) References Cited

U.S. PATENT DOCUMENTS 5,982,891 A    11/1999  Ginter et al.

(Continued)

FOREIGN PATENT DOCUMENTS

EP     0 993 142 A1    4/2000

(Continued)

OTHER PUBLICATIONS

Carsten Griwodz et al., *Protecting VoD the Easier Way*, Proceedings of the ACM Multimedia 98, ACM International Multimedia Conference, New York, NY, vol. CONF. 6, Sep. 12, 1998, pp. 21-28.

*Primary Examiner*—Hong Cho
*Assistant Examiner*—Robert C Scheibel
(74) *Attorney, Agent, or Firm*—Connolly Bove Lodge & Hutz LLP

(57) ABSTRACT

A process for secure distribution of digital audio streams according to a standard, normalized or proprietary format, on which streams a separation of the stream into two parts is made prior to transmission to equipment of an addressee to generate a modified main stream having a format of an original stream and complementary information including digital information suitable for permitting reconstruction of the original stream including: transmitting, by separate paths during a distribution phase, the modified main stream from a distribution server and the complementary information to the equipment of the addressee from a secure central server passing via at least one intermediate server connecting the equipment of the addressee to the central server, wherein the complementary information is defined according to a nominal structured format containing processing units which comprise logical entities with a modulatable size and wherein each of the processing units is prefixed by a heading containing information relative to the processing unit and a useful load containing data and references about the modified main stream, and packetizing the units prior to the transmission.

18 Claims, 1 Drawing Sheet

U.S. PATENT DOCUMENTS

| | | | | |
|---|---|---|---|---|
| 5,987,514 A | * | 11/1999 | Rangarajan | 709/224 |
| 6,091,769 A | * | 7/2000 | Moon | 375/240 |
| 6,377,690 B1 | * | 4/2002 | Witschorik | 380/268 |
| 6,542,992 B1 | * | 4/2003 | Peirce et al. | 713/153 |
| 6,886,040 B1 | * | 4/2005 | Fitzgerald | 709/224 |
| 7,151,832 B1 | * | 12/2006 | Fetkovich et al. | 380/210 |
| 7,298,741 B2 | * | 11/2007 | Hung | 370/389 |
| 7,382,969 B2 | * | 6/2008 | Dawson | 386/94 |
| 2003/0233554 A1 | * | 12/2003 | Litai et al. | 713/182 |
| 2004/0168185 A1 | * | 8/2004 | Dawson et al. | 725/38 |
| 2006/0075135 A1 | * | 4/2006 | Rambhia | 709/238 |

FOREIGN PATENT DOCUMENTS

FR        2 835 386 A1    8/2003

* cited by examiner

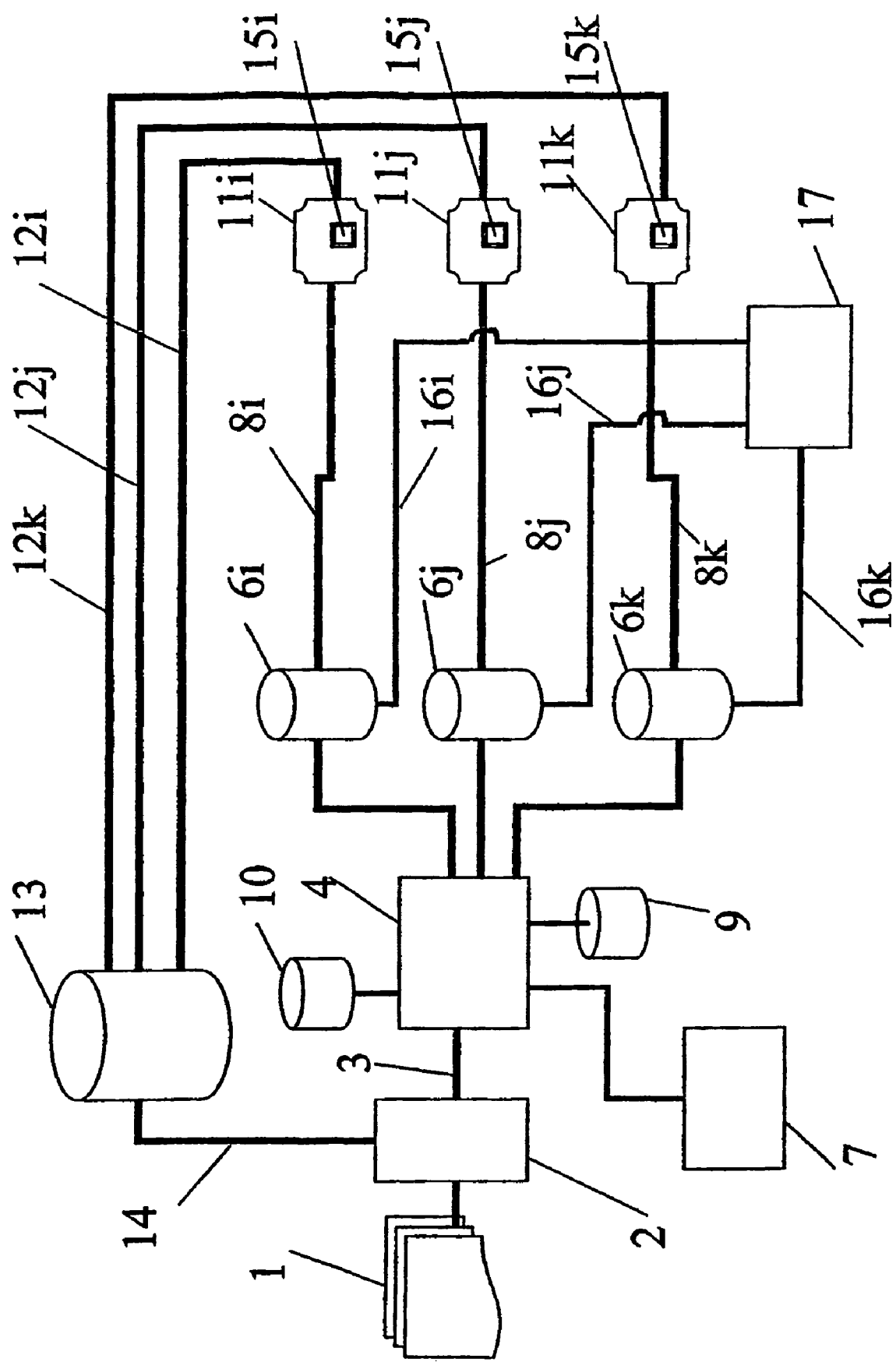

US 7,633,941 B2

SECURED DISTRIBUTED METHOD AND SYSTEM FOR THE DISTRIBUTION OF AUDIOVISUAL FLOWS

RELATED APPLICATION

This is a continuation of International Application No. PCT/FR2004/002652, with an international filing date of Oct. 15, 2004 (WO 2005/039098 A1, published Apr. 28, 2005), which is based on French Patent Application No. 03/50684, filed Oct. 15, 2003.

TECHNOLOGICAL FIELD

This disclosure relates to the area of the secure distribution of digital audiovisual sequences.

BACKGROUND

It is currently possible to transmit audiovisual programs in digital form via broadcasting networks of the microwave (herzian), cable, satellite type, etc. or via telecommunication networks of the DSL type (Digital Subscriber Line) or BLA type of (Local Radio Loop) or via DAB networks (Digital Audio Broadcasting) as well as via any wireless telecommunication network of the GSM, GPRS, EDGE, UMTS, Bluetooth, WiFi types, etc. Moreover, works broadcast in this manner are frequently encrypted or scrambled by various means to avoid pirating.

As concerns the distributed systems based on the client-server principle characterized by "caching," there are also two main types of systems that are classified according to the content treated by this "caching" characterizing an intermediate server also called "cache" server. The term "caching" denotes the possibility of being able to temporarily hold a copy of contents or of data (permanently stored in a central server) at a point or at different points of the network (e.g., intermediate servers) to serve the requests of clients the closest to these points and thus reduce the overload on the central data server and consequently optimize the transmission rate used on the intermediate servers.

The first type processes data whose distribution has no time restrictions (systems for the distribution of files by "caching") and the second type concerns the processing of multimedia (audio/video) data.

The systems for conventional distributed files such as Sun NFS, Apollo Domain, Andrew, IBM AIX, DS, AT&T RFS perform the "caching" of files locally, do not have the possibility of making the "caching" of files in proximate or remote nodes and can not allocate local servers for applying the "caching" to files. Moreover, the conventional distributed systems characterized by "caching" have a granularity of the size of a file and, consequently, the possibilities of having a scalability of the distribution of the contents via the network are greatly reduced.

On the other hand, other distributed multimedia systems characterized by "caching" such as the "Berkeley Distributed VOD," for example, do not obtain a "caching" that is completely secure and personalized for each user, have limited capacities of scalability and are frequently penalized by the limited bandwidth of the networks.

GRIWODZ C and AL "Protecting VOD the Easier Way," XP000977484-ACM 1998 dated Sep. 12, 1998 discloses a method for protecting an MPEG-1 video stream to make it publicly available by cache servers. Protection of the video stream is carried out by a separation of complementary information. The protected video stream contains a corrupted part that is inserted in advance at the site of the separated information.

The corrupted data is independent of the data of the main stream. It is selected by using a calculating algorithm that minimizes attacks by correlation with the protected video stream. The protected video stream is not necessarily in conformity with the MPEG-1 format, that is the format of the main video stream. Then, the method uses "point-to-point" connections (unicast) to supply the complementary part of the data.

The complementary information comprises billing information, user identification information and information for tracing pirates of reproduction rights (by placing watermark mechanisms). The replacement corrects the corrupted part of the data. The complementary information is transmitted to the client by point-to-point (unicast). That part is encrypted at the server by a personal key that can be produced by a trusted third party.

That disclosure responds in particular to the question of scalability for the main video stream by securing the stream with the corruption method; however, that disclosure does not respond to the question of scalability nor to security nor to the distribution of complementary information in the case of networks with a limited bandwidth and a high delay and jitter value such as, e.g., networks of the GSM or GPRS types.

FR 2835386 relates to a video and multimedia interface arrangement of the MPEG-4 type to connect at least one display device to at least one video source, constituted substantially on the one hand of a processing unit adapted in such a manner as to display any video stream of the MPEG-4 type in real or deferred time, store it, record it and/or send it to a broadcasting network and/or to a low bandwidth extended telecommunication network and/or record it on a smart card, and on the other hand by at least one screen interface and one interface for connection to a local or extended network and/or to a smart-card reader, characterized in that it comprises substantially on the one hand a memory of certain correlation coefficients of the I-VOP and/or P-VOP planes and/or a memory of certain B-VOP and P-VOP planes of the video stream in each audiovisual portal, and that on the other hand that each video interface arrangement has functions of storage, recording and processing of audiovisual programs and is associated with at least one apparatus of the integrated display type or of the television screen type, and that each video interface arrangement reconstitutes the MPEG-4 streams coming from information on its own hard disk and algorithms and/or correlation coefficients of the I-VOP and/or P-VOP planes, and/or P-VOP and/or B-VOP planes, all of which comes from the portal.

The technical means consist of proceeding, prior to transmission to the client's equipment, to an analysis of the stream to generate a first modified stream having the format of a nominal stream, and a second stream with any format comprising the digital information suitable for permitting the reconstruction of the modified planes, then in separately transmitting the two streams generated in this manner from the server to the addressee's equipment, and in that a synthesis of a stream in the nominal format is calculated on the addressee's equipment as a function of the first stream and of the second stream.

That disclosure addresses in particular the issue of protection of the video stream of the MPET-4 type by separation of complementary information and the secure sending of the complementary information to the client portal using a secure element such as a smart card. That disclosure does not respond to the question of scalability for the distribution of the complementary information. It also does not respond to the question of securing the information at the cache points or intermediary servers on the network. This latter is characterized by a limited bandwidth and a high delay and jitter value such as, e.g., a network of the GSM or GPRS type.

SUMMARY

In contrast to others, we provide a system characterized by "caching" via intermediate servers in the sense that it processes data in real time, but with the particularity that the processing is performed on elements characterized by a nominal structure formatted in packets, which elements are independent entities called "processing units" from the standpoint of processing and from the standpoint of "caching," which formatted packets carry data for reconstruction of the complete audiovisual information and which formatted packets are personalized for each user and sent to the addressees' equipment in real time via a low bandwidth network from an intermediate server.

The protection applied to the content distributed by the secure distributed system is based on the principle of the suppression (removal or deletion, for example) and replacement of certain information present in the original encoded audiovisual signal by any method, e.g.: substitution, modification, permutation or shifting of the information. This protection is also based on a knowledge of the structure of the digital stream. The solution extracts and permanently retains in a secure server connected to the broadcasting and transmitting network in this complementary information a part of the data of the audiovisual program recorded at the user's or directly broadcasted, which part is of primary importance for reconstituting the audiovisual program on a screen or on an audio output of a terminal, but has a very low volume relative to the total volume of the digital audiovisual program recorded at the user's or received in real time by the user. The missing part (the complementary information) will be transmitted via the secure, distributed broadcasting or transmitting network at the moment of viewing or listening to this audiovisual program. The data removed in the original audiovisual program is substituted to form the modified main stream, by random or calculated data called decoys.

The fact of having removed and substituted with decoys a part of the original data of the original audiovisual stream during the generation of the modified main stream does not permit restitution of the original stream only from the data of the modified main stream. The modified main stream is totally compatible with the format of the original stream and can, therefore, be copied and read by a reader, but it is completely incoherent from the viewpoint of human visual and auditory perception.

Once the digital stream is separated into two parts, the largest part of the audiovisual stream, the modified main stream, is then transmitted via a classic broadcasting network whereas the lacking part, the complementary information, is sent on demand via a narrow band telecommunication network such as a telephone network or cellular network of the GSM, GPRS, EDGE or UMTS type or by using a small part of a network of the DSL or BLR type, or by using a subset of the broadband shared on a cable network, or also via a physical support such as a memory card or any other support. However, the two networks can be combined while retaining the two separate transmission paths. The audiovisual stream is reconstituted on the addressee's equipment by a synthesizing module from the modified main stream and the complementary information sent piece by piece during the using of the audiovisual stream.

This disclosure relates to the secure transmission, after identification and authentication of the user, of complementary information via a distributed network in such a manner as to prevent it from being able to be copied or totally falling into the possession of the user or of any bad-intentioned (ill-disposed) person.

This disclosure includes a process and system that permit the visual and/or auditory protecting of an audiovisual sequence stemming from a digital compression standard or a digital compression norm, distribution of the sequence via a telecommunication network distributed in a secure manner and permit the reconstitution of its original content from a digital audiovisual stream on a recomposition module of the addressee's equipment.

A device is disclosed that is capable of transmitting in a secure manner and via a distributed network a set of high-quality audiovisual streams to a viewing screen and/or to an audio output belonging to a terminal or display device such as a television screen, a computer or even a mobile telephone, a mobile terminal of the PDA (Personal Digital Assistant) type or the like while preserving the audiovisual quality, but avoiding any fraudulent use such as the possibility of making pirated copies of the broadcast contents. A process and client-server system protects the audiovisual contents by separating them into two parts, the second part of which is indispensable for reconstituting the original stream, which latter is restored as a function of recombining of the first part with the second part.

The process separates the audiovisual stream into two parts in such a manner that the first part, called "modified main stream," contains the quasi totality of the initial information, for example, more than 99%, and a second part, called "complementary information," containing targeted elements of the initial information and which is of a very small size compared to the first part.

One aspect concerns a process for the secure distribution of digital audio streams according to a standard, normalized or proprietary format, on which streams a separation of the stream into two parts is made prior to the transmission to the equipment of the addressee to generate a modified main stream having the format of the original stream and complementary information comprising the digital information suitable for permitting the reconstruction of the original stream, characterized in that a transmission is made, by separate paths during the distribution phase, of the modified main stream from a distribution server and the complementary information to the equipment of the addressee from a secure central server passing via at least one intermediate server connecting the equipment of the addressee to the central server, that the complementary information is defined according to a nominal structured format containing logical entities with a modulatable size called "processing units," that each of the processing units is prefixed by a heading containing information relative to this processing unit and a useful load containing data and references about the modified main stream, and that these units are packetized prior to transmission.

In one aspect, the information present in the heading and relative to the processing unit contains time references and position references for the modified main stream.

In another aspect, the packetized units are encrypted prior to transmission. The processing units are preferably compressed prior to being encrypted.

According to another aspect, the central server decides about a dynamic and regular regeneration of the session key during the communication. According to another aspect, the central server decides the adaptation of the degree of encryption of the complementary information as a function of the load on the transmission network.

The intermediate server preferably decides the adaptation of the degree of encryption of the complementary information as a function of the bandwidth allocated to the user. According to one embodiment, encryption of the processing units is personalized for each user.

According to another aspect, the client equipment sends an event report at regular intervals to the server of the complementary information.

The system relates to the secure distribution of audiovisual streams comprising a device for the separation of the original video stream into a modified main stream and into complementary information, at least one multimedia server containing the protected audiovisual streams, at least one secure central server comprising a device for securing and personalizing the complementary information from which the complementary information is distributed, at least one intermediate server, at least one module for managing correspondences between the modified main stream and the complementary information associated with it, at least one module for managing subscribers, at least one module for managing and generating session keys, at least one device in the addressee's equipment comprising a smart card for decrypting the session key and at least one module for reconstructing the original audiovisual stream as a function of the modified main stream and of the complementary information.

BRIEF DESCRIPTION OF THE DRAWING

The Drawing is a schematic of a secure and reliable distribution system.

DESCRIPTION

The disclosure will be better understood with the aid of the exemplary embodiments and of the stages discussed in detail below. A preferred, but non-limiting exemplary embodiment of the process is illustrated by the client-server system shown in the Drawing.

It will be appreciated that the following description is intended to refer to specific embodiments of the invention selected for illustration in the drawings and is not intended to define or limit the invention, other than in the appended claims.

Turning now to the Drawing, the original audiovisual stream 1 is transmitted to analysis and scrambling module 2 to be separated into two parts. Modified main stream 14 is stored in multimedia server 13. It can then be sent in real time to the client via broadband network 12$i$ or be recorded on the backup device of terminal 11$i$ of the user for later viewing. The complementary information 3 is sent to the storage module of secure central server 4.

Since the complementary information is sent solely on demand, its distribution in real time and its personalization for each user is realized taking into account the property of scalability in the transmission rate on the transport and broadcasting networks. The notion of "scalability in the transmission rate" is defined as the capacity of a network to manage, modify, distribute and adapt the transmission rate of the streams transiting as a function of the available or negotiated bandwidth and as a function of the network congestions. To respond to the requirements of sending in real time and by virtue of the low transmission rate required by the complementary information for its transmission, the complementary information generated by module 2 corresponds to a structured nominal format.

The complementary information represents a binary stream of data comprising the values of the elements extracted from the original stream. The complementary information is constituted by logical components (entities) called "packets," that can be readily manipulated and have modulatable sizes. A packet is the elementary reception entity and is constituted of a packet heading called the primary node and by one or more secondary nodes. The packet heading contains a set of temporal metadata and positions that define the packet in a unique manner in the stream. A secondary node is the elementary processing entity at the level of the client equipment 11$i$, is conjointly connected to the packet heading and sufficient within itself in terms of processing. The temporal metadata of the packet heading are temporal synchronization imprints extracted from the original stream or generated during the creation and the formatting of the complementary information. The positional metadata permit a ready positioning in the stream and offer management services for rights of use such as the possibility of prohibiting a replaying of the audiovisual stream, and thus each packet heading is provided with a field called the packet subscript (mark, index). This field is generated by a counter that is incremented at each sending of a packet. This packet structure confers on the complementary information a flexibility in terms of processing in terms of the facility of synchronization with the central server and also in terms of distribution, as will be subsequently explained with the aid of an exemplary embodiment of architecture based on the client-server model comprising the following modules:

cache servers (or intermediate servers) (6$i$, 6$j$, 6$k$) for responding locally to client requests;

a central server 4 that receives the client requests in the case that the contents requested are not referenced in the intermediate servers;

a module for managing correspondences between the modified main stream and the complementary information associated with it 17;

a subscriber management module 9;

a module for generating and managing session keys 10; and a connection to an authority for the certification of public keys of subscribers 7.

The example below describes the complete process for the recovery of the complementary information on the network. When the user wishes, e.g., to view a sequence he connects via his equipment 11$i$ and link 8$i$ to intermediate server 6$i$ accomplishing the caching function, that redirects the request to central server 4 in the case of a first request relative to this stream that is not part of the streams referenced on intermediate server 6$i$. In a variant the stream to be viewed is stored in advance on the backup device of the client equipment comprising a decoder, a backup device, a smart card 15$i$, a viewing screen and audio outputs. In another variant the stream to be viewed is sent in real time from media server 13 via high-throughput link 12$i$ in order to be displayed on the viewing screen of device 11$i$.

Device 11$i$ formulates the request of the user in the form of a request to physically closest intermediate server 6$i$, which request is provided with the signature of the media that the client requested to view. Intermediate server 6$i$ consults module 17 containing the database of correspondences between the modified main stream and the complementary information associated with it and, if required, redirects the request to central server 4 in order to proceed to the authentication of the client. In the instance that intermediate server 6$i$ cannot find the complementary information in module 17, cache server 6$i$ sends a message to client equipment 11$i$ informing it that it can not process the request and addresses central server 4 on the same occasion in order to report this message in order that central server 4 proceeds to update its own database of complementary information.

Before sending the complementary information from intermediate server 6i or from central server 4, central server 4 proceeds to an authentication phase with client equipment 11i and to sending the encrypted complementary information. A hybrid cryptographic approach is used with advantage that groups together the performances of cryptography with a secret key and the flexibility of use of cryptography with a public key. Client equipment 11i has a private key etched on its smart card 15 and a public key available in digital form. At the beginning of the connection client equipment 11i sends to central server 4 its identifier (e.g., the identifier of its decoder box or the serial number of the decoding circuit), and its public key signed by certification authority 7. Central server 4 receives the public key of the client and proceeds to verify its authenticity in key certification module 7.

Central server 4 then requests the generation of a session key from the module for generating and managing session keys 10, which key is random and the security of the transaction is based in large part on this aspect. The complementary information or a part of the complementary information is then encrypted with this session key using a conventional symmetric cryptographic algorithm, e.g., DES ("Digital Encryption Standard"), AES ("Advanced Encryption Standard") to gain a more rapid processing. The session key is then encrypted itself with the public key of the client. The complementary information encrypted in this manner and the session key encrypted in this manner are sent to the client's equipment 11i. A message for checking the authenticity ("Message Authentification Code") of the complementary information or of an encrypted part of the complementary information is also sent to certify the authenticity and the integrity of the contents. The complementary information is preferably compressed by server 4 or intermediate server 6i before being encrypted and sent to the client, which compression permits the elimination of multiple occurrences of elements in the complementary information and thus permits the resistance to cryptanalysis to be improved.

The entire or partial encryption of the complementary information is preferably carried out as a function of the load on the transmission network and/or on the bandwidth allocated to the user.

The entire or partial encryption of the complementary information is advantageously carried out taking into account the characteristic of the throughput scalability of the transmission network.

The decision to apply an entire or partial encryption to the complementary information may be made by central server 4. The decision to apply an entire or partial encryption to the complementary information may also be made by intermediate server 6i. The encryption of the complementary information is preferably personalized for each client.

Furthermore, the client's equipment sends an event report at regular intervals to complementary information server 6i containing data relative to the connection (bandwidth, channel quality, for example). This event report is transmitted to central server 4, that proceeds to update the data for managing subscribers of module 9.

The process of decryption by the client begins with the extraction of the session key using the secret client key, followed by a deciphering of the complementary information or of the part of the complementary information by the session key decrypted in this manner.

To further increase the security of the transaction the server preferably requests a dynamic and regular regeneration of the session key, which permits a reinforcing of the security and deflects pirating attempts by ill-disposed persons.

The process is advantageously implemented for a set of clients 11i, 11j, 11k, connected respectively to intermediate servers 6i, 6j, 6k by links 8i, 8j, 8k. Each client has a smart card 15i, 15j, 15k. Each intermediate server 6i, 6j, 6k is connected by links 16i, 16j and 16k to module 17 containing the database of correspondences between the modified main stream and the complementary information associated with it.

The invention claimed is:

1. A process for secure distribution of digital audiovisual streams according to a standard, normalized or proprietary format, comprising:
    separating an original stream to generate a modified stream having a format corresponding to a format of the original stream and complementary information comprising digital information suitable to enable reconstructing the original stream;
    transmitting to equipment of an addressee, using separate transmission paths, the modified stream from a distribution server and the complementary information from a secure central server, the transmission path for the complementary information including at least one intermediate server connecting the equipment of the addressee to the central server, wherein the complementary information is defined according to a nominal structured format containing processing units that include logical entities with a modulatable size, and wherein the respective processing units include load information containing data and references about the modified stream, wherein the distribution server and the secure central server are distinct from one another.

2. The process according to claim 1, wherein at least one of the processing units is prefixed by a heading including information relative to the processing unit, and which contains time references and position references for the modified stream.

3. The process according to claim 1, further comprising packetizing and encrypting the processing units prior to transmission.

4. The process according to claim 1, further comprising compressing, and then encrypting, the processing units.

5. The process according to claim 1, further comprising determining, by the central server, a dynamic and regular regeneration of a session key during communication.

6. The process according to claim 1, further comprising determining, by the central server, a degree of encryption of the complementary information as a function of load on the transmission network.

7. The process according to claim 1, further comprising determining, by an intermediate server, a degree of encryption of the complementary information as a function of bandwidth allocated to the user.

8. The process according to claim 1, further comprising encrypting the processing units, wherein the encrypting is personalized for respective users.

9. The process according to claim 1, further comprising receiving, at the server of the complementary information, event reports sent by the addressee equipment at regular intervals.

10. A system to distribute audiovisual streams, comprising;
    a device configured to separate an original video stream into a modified stream and into complementary information, wherein said modified stream has a format corresponding to a format of the original video stream, and wherein the complementary information includes digital information suitable for permitting reconstruction of the original video stream, and wherein the complementary information is defined according to a nominal structured format containing processing units that comprise logical entities with a modulatable size, and wherein the processing units include respective load information containing data and references about the modified stream;

at least one multimedia server configured to contain one or more protected audiovisual streams, wherein the one or more protected audiovisual streams include one or more modified streams produced by the device configured to separate an original video stream;

at least one secure central server, including a device for securing and personalizing the complementary information, and configured to distribute the complementary information to at least one addressee via a transmission path that includes at least one intermediate server.

11. The system according to claim 10, further comprising:
at least one module configured to manage correspondence between the modified stream and the complementary information associated with the modified stream.

12. The system according to claim 10, further comprising:
at least one module configured to manage subscribers.

13. The system according to claim 10, further comprising:
at least one module configured to manage and generate session keys.

14. The system according to claim 10, wherein the at least one multimedia server and the at least one secure central server are distinct from one another.

15. The system according to claim 10, wherein the multimedia server is configured to transmit the modified stream to the addressee via a transmission path that is different from the transmission path used by the secure central server to transmit the complementary information to the addressee.

16. An apparatus for receiving a modified stream and complementary information corresponding to an original audiovisual stream, the apparatus comprising:
   at least one device configured to decrypt a session key associated with communication of the complementary information associated with the original audiovisual stream, wherein the device includes at least one smart card;
   at least one device configured to decrypt the complementary information, using the decrypted session key; and
   at least one module configured to reconstruct the original audiovisual stream as a function of the modified stream and the complementary information,
   wherein the modified stream and the complementary information are derived from the original audiovisual stream by separating the original audiovisual stream into the modified stream and the complementary information, wherein the modified stream has a format corresponding to a format of the original audiovisual stream, and wherein the complementary information includes digital information suitable for permitting reconstruction of the original audiovisual stream, and wherein the complementary information is defined according to a nominal structured format containing processing units that comprise logical entities with a modulatable size, and wherein the processing units include respective load information containing data and references about the modified stream.

17. The apparatus according to claim 16, wherein the session key is varied during the course of communicating the complementary information associated with the original audiovisual stream.

18. The apparatus according to claim 16, wherein the smart card includes a private key, and wherein the private key is to be used to decrypt the session key.

* * * * *

UNITED STATES PATENT AND TRADEMARK OFFICE
CERTIFICATE OF CORRECTION

PATENT NO. : 7,633,941 B2 Page 1 of 1
APPLICATION NO. : 11/387284
DATED : December 15, 2009
INVENTOR(S) : Lecomte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this

Twenty-first Day of December, 2010

David J. Kappos
*Director of the United States Patent and Trademark Office*